United States Patent
Kantola et al.

(10) Patent No.: US 7,433,677 B2
(45) Date of Patent: Oct. 7, 2008

(54) COMMUNICATION DEVICES AND METHOD OF COMMUNICATION

(75) Inventors: Matti Kantola, Nokia (FI); Jukka Parkkinen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/848,515

(22) Filed: May 3, 2001

(65) Prior Publication Data

US 2002/0004374 A1    Jan. 10, 2002

(30) Foreign Application Priority Data

May 5, 2000    (GB)    ................. 0010982.7

(51) Int. Cl.
*H04M 1/66*    (2006.01)
(52) U.S. Cl. ............ 455/410; 455/411; 455/418; 455/41.1; 340/5.8; 340/10.42
(58) Field of Classification Search ........ 455/410, 455/411, 418, 41.1, 41.2, 41.3, 556.1, 558.1; 340/5.8, 10.42
See application file for complete search history.

(56) References Cited

U.S. PATENT DOCUMENTS

| | | | |
|---|---|---|---|
| 5,625,669 A * | 4/1997 | McGregor et al. | 455/418 |
| 5,627,517 A * | 5/1997 | Theimer et al. | 340/572.1 |
| 5,917,913 A * | 6/1999 | Wang | 705/67 |
| 5,943,624 A * | 8/1999 | Fox et al. | 455/556.1 |
| 6,144,847 A * | 11/2000 | Altschul et al. | 455/407 |
| 6,175,860 B1 * | 1/2001 | Gaucher | 709/208 |
| 6,175,922 B1 * | 1/2001 | Wang | 713/182 |
| 6,539,422 B1 * | 3/2003 | Hunt et al. | 709/217 |
| 6,634,560 B1 * | 10/2003 | Grabau | 235/492 |
| 6,832,082 B1 * | 12/2004 | Ramaswamy et al. | 455/411 |
| 7,174,564 B1 * | 2/2007 | Weatherspoon et al. | 726/2 |
| 2002/0022483 A1 * | 2/2002 | Thompson et al. | 455/439 |
| 2003/0055735 A1 * | 3/2003 | Cameron et al. | 705/26 |

FOREIGN PATENT DOCUMENTS

| | | |
|---|---|---|
| EP | 0780802 A2 | 6/1997 |
| WO | WO 01/080193 A1 | 10/2001 |

* cited by examiner

*Primary Examiner*—Matthew Anderson
*Assistant Examiner*—Minh Dao
(74) *Attorney, Agent, or Firm*—Perman & Green, LLP

(57) ABSTRACT

In a portable communications device, information provided by an identification means is used to establish communication between communication means and a second device, such as a point of sale machine, to ensure that the correct portable communications device is connected to the second device where there may be a large number of second devices and a large number of portable communications devices in close proximity.

19 Claims, 3 Drawing Sheets

COMMUNICATION DEVICES AND METHOD OF COMMUNICATION

FIELD OF THE INVENTION

The present invention relates to communication devices and a method of communication. In particular, but not exclusively, the present invention relates to wireless communications devices and a method of wireless communications.

BACKGROUND OF THE INVENTION

It has been proposed to use mobile stations instead of credit cards at a point of sale. In this proposal, it has been suggested that a wireless link be established between the point of sale device and the mobile station. The mobile station may provide the point of sale device with similar information to that provided by a credit card.

One problem with this proposal is how to ensure that the correct mobile station is connected to the point of sale device. For example, in a busy supermarket, there may be a large number of point of sale devices and a large number of mobile stations. It is important that the right point of sale device be connected to the right mobile station. Clearly, considerable problems would be caused if the wrong mobile station was connected to the wrong point of sale device. The user of a mobile station could be charged for goods not purchased by the user.

SUMMARY OF THE INVENTION

It is an aim of embodiments of the present invention to address the above problems.

According to one aspect of the present invention, there is provided a portable communications device comprising communication means for communicating with a another party, and identification means for separately providing information on said device, said another party being arranged to obtain said information from said identification means and to use said information to establish communication with said communication means.

The identification means may comprise a bar code, a radio frequency tag or a magnetic data carrying arrangement. The bar code may be arranged on the exterior of the communications device or may be displayed on a display of the communications device. The magnetic data carrying arrangement may comprise a magnetic strip.

The information provided by said identification means may comprise one or more of the following: identity of the device; address of the device when the communication means are used and identity of the user.

The third party may be one of the following devices: point of sale device; ticket sale device; and information kiosk.

The link with the another party may be a wireless link. The wireless link may be a high frequency link, for example of the order of giga Hertz. The wireless link may be a Bluetooth link. Alternatively, the wireless link may be an infrared link. The communications device is preferably a mobile telephone.

According to a second aspect of the present invention, there is provided a communications device comprising communication means for communicating with a portable party, and identification means for separately providing information on said device, said portable party being arranged to obtain said information from said identification means and to use said information to establish communication with said communication means.

According to a third aspect of the present invention, there is provided a method of establishing a communications connection between a portable communications device and another party, said method comprising one of said another party and said portable communications device obtaining information from the other of said another party and said portable communications device; and using said information to separately establish communications between said another party and said communications device.

BRIEF DESCRIPTION OF THE DRAWINGS

For a better understanding of the present invention and as to how the same may be carried into effect, reference will now be made by way of example only to the accompanying drawings in which.

DETAILED DESCRIPTION OF EMBODIMENTS OF THE INVENTION

Figure 1:
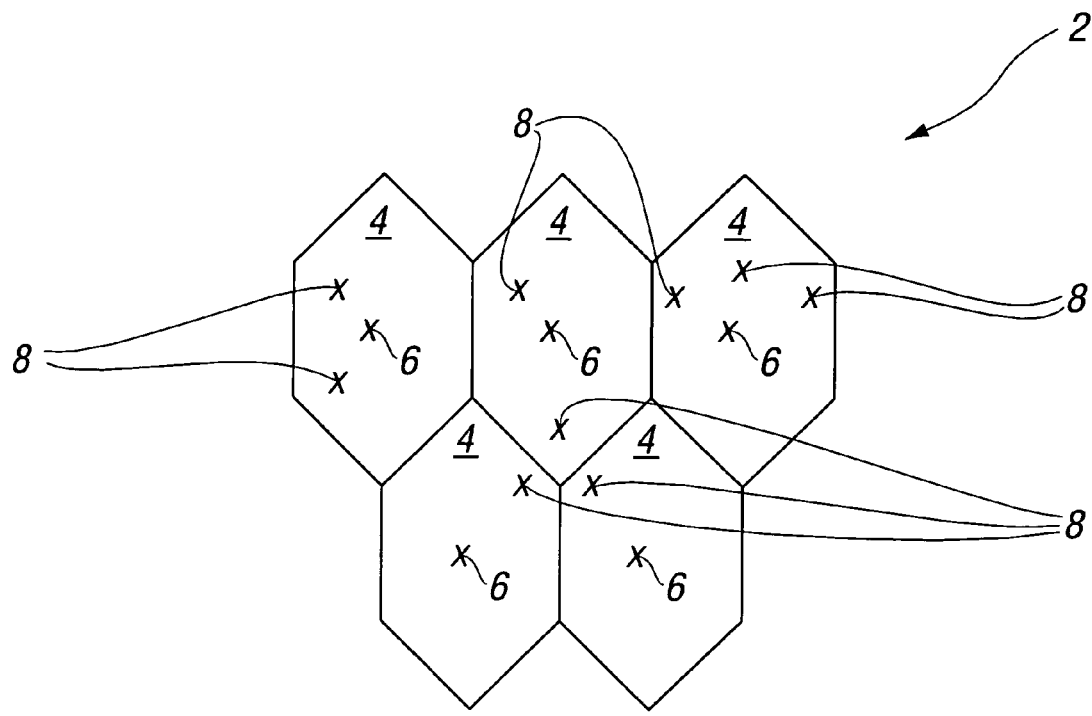
FIG. 1 shows a typical cellular telecommunications network.

Reference is made to FIG. 1 which shows a typical cellular telecommunications network. The area covered by the network 2 is divided into a plurality of cells 4. Each cell 4 is served by a base transceiver station 6. Each base transceiver station 6 is arranged to communicate with mobile stations 8 in the cell associated with that base transceiver station 6.

The cellular network 2 can use any suitable method of communication. Known methods of communication include those based on time division multiple access, frequency division multiple access and spread spectrum techniques such as code division multiple access. Hybrids of two or more of these access techniques can also be used. In the following description, the mobile station is described as operating in accordance with the UMTS (Universal Mobile Telephone System) standard, which uses code division multiple access. However, the mobile station can operate in accordance with any other suitable standard, for example GSM (Global System for Mobile Communications). GSM uses a time/frequency division multiple access technique.

Figure 2:
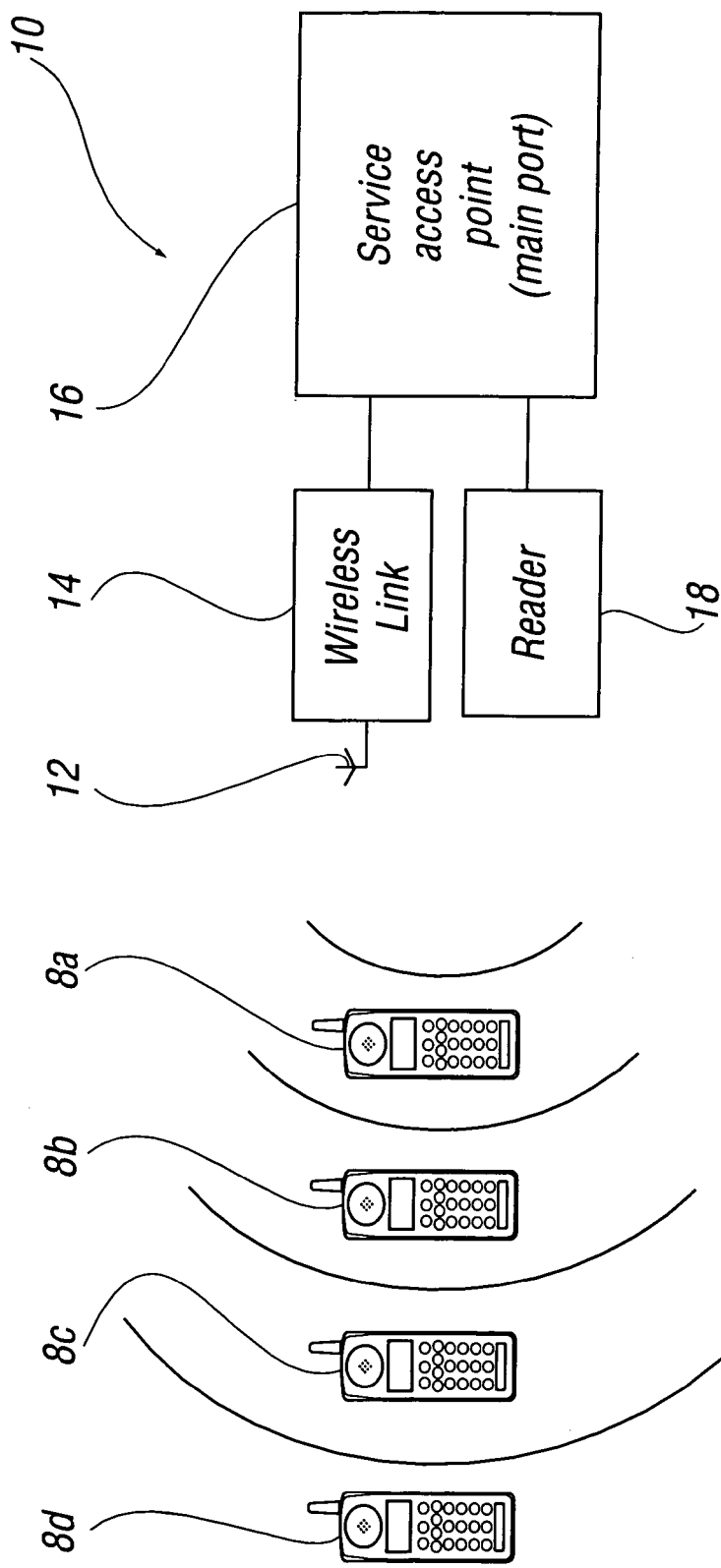
FIG. 2 shows a block diagram of an embodiment of the present invention.

Reference will now be made to FIG. 2 which shows a block diagram of an embodiment of the present invention. Shown in FIG. 2 is a service access point 10. The service access point, as will be discussed in more detail late, may be a point of sale device, a ticket gate, an information kiosk or any other suitable service access point. The service access point can be a communication device. The communication device providing the service access point may be arranged to communicate with entities other than the closest mobile station using wired or wireless technologies. Alternatively the communication device may be arranged to communicate only with the closest mobile station. The service access point may be fixed or mobile.

The service access point 10 has an antenna 12. The antenna 12 is arranged to receive signals from a mobile station. The received signals are passed to a wireless link 14. The wireless link processes the received signals and puts the received data into a format which can be used by the main part 16 of the service access point. The wireless link may convert the received signal to a base band frequency and may carry out decoding and demodulation, as is well known.

The antenna 12 is also arranged to transmit signals to a mobile station. The wireless link 14 receives the data to be transmitted and puts it into a format suitable for transmission. The wireless link 14 may up convert the signals, encode and modulate the data before passing it to the antenna 12 for transmission.

The service access point 10 also comprises a reader 18. The reader 18 is arranged to read information provided by a mobile station 8. This will be described in more detail hereinafter. FIG. 2 illustrates how embodiments of the invention are able to overcome the difficulties described earlier. In the arrangement shown in FIG. 2, four mobile stations 8a-d are provided. Each of these four mobile stations is reasonably close to the service access point. In the embodiment of the invention, it is desired to establish a connection between the first mobile station 8a and the service access point. It is extremely disadvantageous if, by mistake, a connection were to be established with any of the other three mobile stations 8b to 8d.

Figure 3:
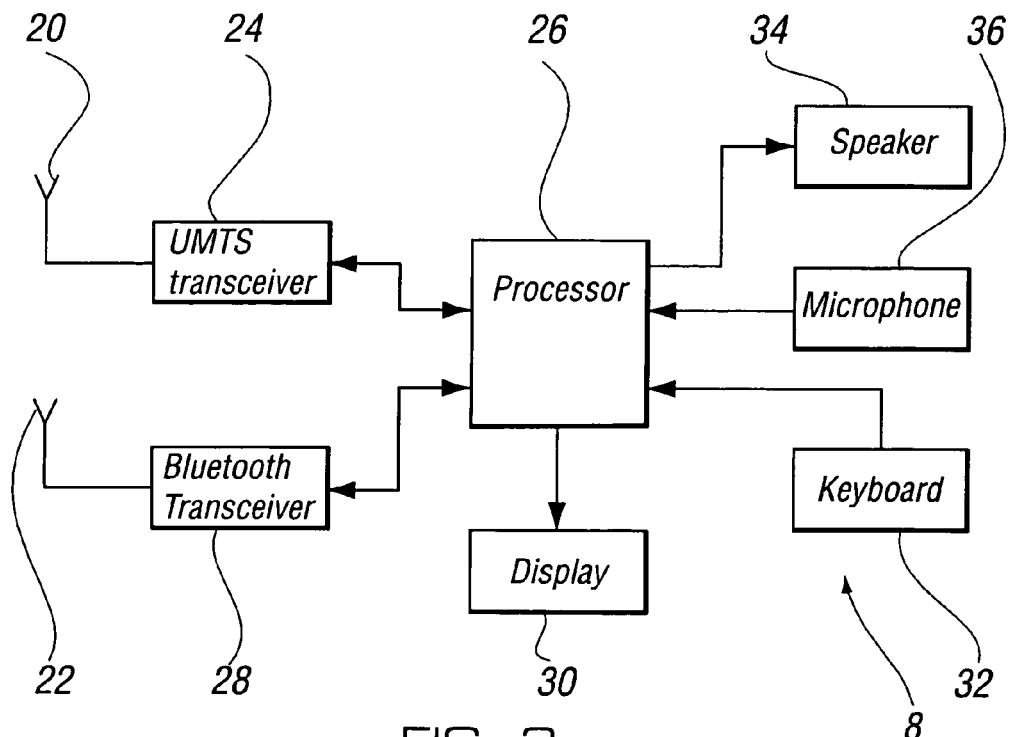
FIG. 3 shows the structure of the mobile station of FIG. 2.

The structure of the mobile station 8 is shown in FIG. 3. The mobile station 8 has a first antenna 20 and a second antenna 22. The first antenna 20 is connected to a UMTS transceiver 24. The UMTS transceiver 24 is arranged to receive signals from the antenna 20 at a UMTS frequency. The UMTS transceiver 24 decodes the signals, demodulates them and also reduces them to the base band frequency. The output of the UMTS transceiver 24 thus consists of a stream of data. That stream of data may require further processing by the processor 26.

The UMTS transceiver also receives data from the processor 26 which is to be transmitted by the mobile station. The UMTS transceiver 24 encodes, modulates and up converts the signal to the radio frequency which is to be used. The radio frequency signal is then transmitted by the antenna 20.

The second antenna 22 is connected to a Bluetooth transceiver. Bluetooth is a proposed new standard that uses relatively low power radio frequency signals. The frequency may be in the GHz range. This is quite different to the UMTS frequencies. For this reason, separate antennas 20 and 22 are usually provided for the two different types of signal. The Bluetooth transceiver 28 receives Bluetooth frequency signals from the second antenna 22 and decodes, demodulates and down converts those signals. The data output by the Bluetooth transceiver 28 is input to the processor 26. The processor 26 is also arranged to provide data to the Bluetooth transceiver 28 which is to be transmitted by the Bluetooth antenna 22. This data is up converted to the Bluetooth frequency, modulated and encoded before being transmitted by the second antenna 22.

The mobile station 8 also has a display 30. The display is controlled by the processor 26 and provides information for the user. A keypad 32 is provided to allow the user to input numbers and other information. The information input via the keypad 32 is input to the processor 26 which may be controlled in accordance with the input information. The mobile station has a speaker 34. This is controlled by the processor 26 and outputs audio signals which can be heard by the user. A microphone 36 is provided to pick up the user's voice. The microphone signals are input to the processor 26 which converts the signals into a format suitable for output to the UMTS transceiver 24.

Referring back to FIG. 2, the mobile station is provided with some form of identification. When the mobile station is moved close to the reader 18, the identification of the mobile station 8 is read. The information included in the identification is sufficient to allow a Bluetooth connection to be established between the service access point 10 and the mobile station 8a. The reader has a very short range and is thus only able to obtain the necessary information from the mobile station 8a when the mobile station is very close to the reader 18. The reader 18 would not be able to read the identification information included on mobile stations 8b to 8d. This means that it can be ensured that the connection to the right mobile station is established.

The information included in the identification can include any suitable information to allow the connection to be established. In preferred embodiments of the present invention, the identification includes a unique device address for the mobile station. This is effectively the Bluetooth address of the mobile station. This identity can be regarded as being similar to the telephone number of the mobile station. However, the UMTS telephone number will be different from the Bluetooth address. It is the Bluetooth number that is included in the identification information.

Reference will now be made to FIGS. 4 to 7, which show various examples of how the identity information can be provided.

Figure 4:
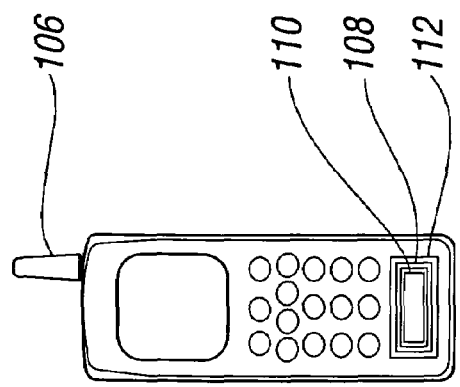
FIG. 4 shows a first embodiment of a mobile station which can be used in the arrangement of FIG. 2.

Reference is first made to FIG. 4 which shows a first mobile station 100. The mobile station 100 is as shown in FIG. 3 and additionally comprises a bar code 102. The bar code 102 is provided on the outer surface of the casing. In the arrangement shown in FIG. 4, the bar code is provided on the front of the mobile station 100, below the key pad 32 which in turn is below the display 30. However, the bar code 102 can be provided on any other suitable part of the casing. For example, the bar code may be provided on the back of the device or along any one of the four sides. The bar code may even be provided along the side of the antenna.

The reader 18 would, in this case, be a bar code reader and would read the bar code 102. The bar code reader 18 would be able to read the unique address contained in the bar code 102. Using that information, the service access point 10 is able to establish a connection with the Bluetooth transceiver 28 of the mobile station.

Figure 5:
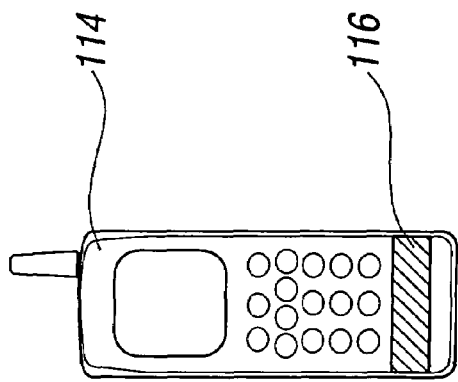
FIG. 5 shows a second embodiment of a mobile station which can be used in the arrangement of FIG. 2.

Reference is now made to FIG. 5 which shows a mobile station 104 which is modified as compared to the mobile station of FIG. 4. The identification takes the form of a bar code 102 which is displayed on the display 30. The reader 18 again would be a bar code reader and would read the bar code on the display 30.

This latter arrangement has the advantage in that the address of the mobile station can easily be changed without having to replace a bar code on the external cover of the mobile station.

Figure 6:
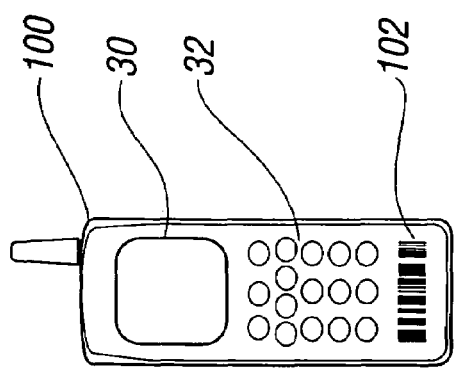
FIG. 6 shows a third embodiment of a mobile station which can be used in the arrangement of FIG. 2.

Reference is made to FIG. 6 which shows an alternative mobile station 106 embodying the present invention. The identification is provided by a radio frequency tag 108. These tags are well known and generally comprise an integrated circuit surrounded by an antenna element. The integrated circuit includes the identity of the mobile station and in particular, its Bluetooth address. The integrated circuit comprises a transponder chip. The reader 18 provides a radio frequency interrogation signal. The frequency of the interrogation signal is selected so that it does not interfere with either the Bluetooth frequencies or the UMTS frequencies. The interrogation signal produces a magnetic flux field that is magnetically coupled to the antenna to energise the latter and to provide power for the transponder integrated circuit.

Accordingly, no battery or power supply is required for the radio frequency tag. When the antenna has been energised, the transponder circuitry assembles an identification code signal which includes the Bluetooth address of the mobile station. This signal is fed to the antenna which causes the antenna to transmit an information signal which is received by the reader 18. The reader is thus able to obtain the required information.

It should be appreciated that any alternative embodiment of the radio frequency tag can be used in alternative embodiments of the present invention. The radio frequency tag can be incorporated on an exterior surface of the mobile station. However, in preferred embodiments of the present invention, the radio frequency tag can be provided inside the casing as the reader will be able to interrogate the tag through the casing.

Figure 7:
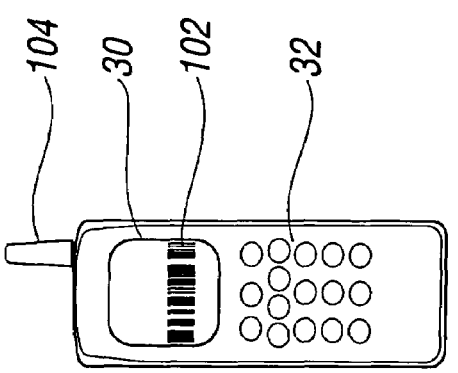
FIG. 7 shows a fourth embodiment of a mobile station which can be used in the arrangement of FIG. 2.

Reference is made to FIG. 7 which shows a fourth embodiment of the present invention. The mobile station 114 is provided with a magnetic strip 116. The reader 18 is thus arranged to read the magnetic strip. It should be appreciated that in alternative embodiments of the present invention, the information can be carried by other forms of magnetic carrier.

In the embodiments of the invention described, the identification is provided on the mobile station. However, it is possible in certain embodiments of the present invention, that the reading apparatus be provided on the mobile station and the identification be provided at the service access point. In the latter case, communications would be established by the mobile station. In the embodiments described earlier, the communication between the Bluetooth transceiver of the mobile station and the service access point is initiated by the service access point.

The preferred embodiments of the present invention have been described as using a Bluetooth link. However, it should be appreciated that any other suitable radio frequency can be used. For example, infrared frequencies may be used. Preferred embodiments of the present invention use a short range connection between the mobile station and the service access point. However, this may not be required in certain embodiments of the present invention.

Embodiments of the present invention have a number of different applications. In one embodiment, the mobile station is used to make a transaction with and effectively acts as a credit card, a debit card or an electronic purse. Credit card information for money transfer is done using the Bluetooth connection link which is established between the service access point and the mobile station.

Embodiments of the present invention can for example be used at ticket gates. The mobile station includes a ticket to go to a film, concert, sports match or the like. The Bluetooth connection is established between the mobile station and the ticket gate using the identification information. The confirmation of the ticket details are then provided to the ticket gate from the mobile station via the Bluetooth link.

Embodiments of the invention can be used to obtain information from an information station. The ink is established and the information is exchanged using the Bluetooth connection. For example, the user can obtain train times etc from the information kiosk.

In an alternative embodiment of the present invention, the mobile station can be used to communicate with an automatic teller machine ATM to complete financial operations such as the loading of cash to an electronic purse, the withdrawal of cash or the like. The secure communication link between the station and the ATM is established with the ATM reading the address of the mobile station from its bar code or the like.

In some embodiments of the present invention, the mobile station may be arranged to act sole as a credit card or the like. In that case the UMTS circuitry can be omitted. The mobile station may thus include only the Bluetooth related circuitry. The display, keypad, speaker and/or microphone may therefore be omitted.

The described embodiments of the present invention have described a technique for establishing a connection between a service access point and a mobile station. It should be appreciated that embodiments of the present invention may be used to provide communication between any two or more communication devices. For example, embodiments of the present invention can be used to establish a connection between two or more mobile stations.

In the preferred embodiments of the present invention, the mobile station may be replaced by any suitable communication device. It should be appreciated that in some embodiments of the invention, the communication capabilities of the communication device and/or the service access point may be very limited. In alternative embodiments of the present invention, the communication capabilities of the communication device and/or the service access point may be more extensive.

The invention claimed is:

1. A portable communications device comprising communication means for communicating with a second device over a first communication link, and identification means, separate from said communication means, said identification means arranged to independently provide information identifying said portable communications device, from said identification means to said second device by means of a second communication link, to enable a communication connection over said first communication link between said communication means and said second device.

2. A portable communications device as claimed in claim 1, wherein said identification means comprises a bar code and said second communication link comprises a bar code reader.

3. A portable communications device as claimed in claim 2, wherein the bar code is arranged on the exterior of the communications device.

4. A portable communications device as claimed in claim 2, wherein the bar code is arranged to be displayed on a display of the communications device.

5. A portable communications device as claimed in claim 1, wherein said identification means comprises a radio frequency tag and said second communication device comprises a radio frequency tag receiver.

6. A portable communications device as claimed in claim 1, wherein said identification means comprises a magnetic data carrying arrangement and said second communication link comprises a magnetic data reader.

7. A portable communications device as claimed in claim 6, wherein said magnetic data carrying arrangement comprises a magnetic strip.

8. A portable communications device as claimed in claim 1, wherein said information provided by said identification means comprises one or more of the following:
   identity of the device; address of the device when the communication means are used; and identity of the user.

9. A portable communications device as claimed in claim 1, wherein said second device is one of the following devices:
   point of sale device;
   ticket gate device; and
   information kiosk.

10. A portable communications device as claimed in claim 1, wherein said first communication link with said second device is a wireless link.

11. A portable communications device as claimed in claim 10, wherein said wireless link is a high frequency link.

12. A portable communications device as claimed in claim 11, wherein said high frequency link is of the order of giga Hertz.

13. A portable communications device as claimed in claim 12, wherein said wireless link is a Bluetooth link.

14. A portable communications device as claimed in claim 10, wherein the wireless link is an infrared link.

15. A portable communications device as claimed in claim 1, wherein said communications device is a mobile telephone.

16. A communications device comprising communication means for communicating with a portable device over a first communication link, and identification means, separate from said communication means, said identification means arranged to independently provide information identifying said communications device, to said portable device over a second communication link to enable a communication connection over said first communication link between said communication means and said portable device.

17. A method of establishing a communications connection between a portable communications device and a second device over a first communication link, said method comprising:

one of said second device and said portable communications device obtaining identification information from the other, by an identification means over a second communication link separate from the first communication link; and using said information to enable the communication connection between said second device and said communications device over said first communication link.

18. A method as claimed in claim 17, wherein said second device comprises a portable communications device.

19. A method as claimed in claim 17, wherein at least one of said second device and said portable communications device comprises a mobile telephone.

* * * * *